United States Patent [19]
Liechti et al.

[11] Patent Number: 5,891,344
[45] Date of Patent: Apr. 6, 1999

[54] OZONE ENRICHED PROCESS GAS

[75] Inventors: Pierre A. Liechti, Regensdorf; Helmut Lang, Wettingen, both of Switzerland

[73] Assignee: Ozonia International, Rueil-Malmaison, France

[21] Appl. No.: 629,940

[22] Filed: Apr. 12, 1996

[30]  Foreign Application Priority Data

Apr. 26, 1995 [CH] Switzerland ............................. 1195/95

[51] Int. Cl.[6] ..................................................... C02F 1/78
[52] U.S. Cl. ............................ 210/739; 162/65; 210/760; 423/581
[58] Field of Search ..................................... 210/760, 192, 210/198.1, 205, 739, 740, 96.1; 162/65; 423/581

[56]    References Cited

U.S. PATENT DOCUMENTS 5,366,703  11/1994  Liechti et al. ..................... 422/186.11
5,567,274  10/1996  Funk et al. ................................ 162/49

*Primary Examiner*—Peter A. Hruskoci
*Attorney, Agent, or Firm*—Pollock, Vande Sande & Amernick

[57] ABSTRACT

A flow control apparatus for enriching gas containing oxygen with ozone includes a generator for producing the enriched mixture. A flow meter is connected to the generator outlet to measure the flow of the generated enriched gas. A mass flow control device is connected downstream of the flow meter. A flow control comparator compares a flow value as obtained from the measuring means and a preset constant value. A signal output of the flow control comparator is connected to a signal input of the mass flow control device for varying the mass flow in accordance with the comparison. An outlet of the mass flow control device is connected to an inlet of a compressor for compressing gas, the inlet gas pressure varying to keep compressed gas at a constant pressure. Feedback is provided between an outlet and an inlet of the compressor. A second mass control device is intermediately connected along the feedback connection for adjusting the mass flow of gas passing through the feedback means. A pressure control comparator compares the inlet pressure of the compressor to a second preset constant value. A signal output of the pressure control device is connected to a signal input of the mass flow control device for varying the mass flow being fedback in accordance with the comparison. The flow controlled compressed gas is delivered to a reactor at a constant pressure.

4 Claims, 1 Drawing Sheet

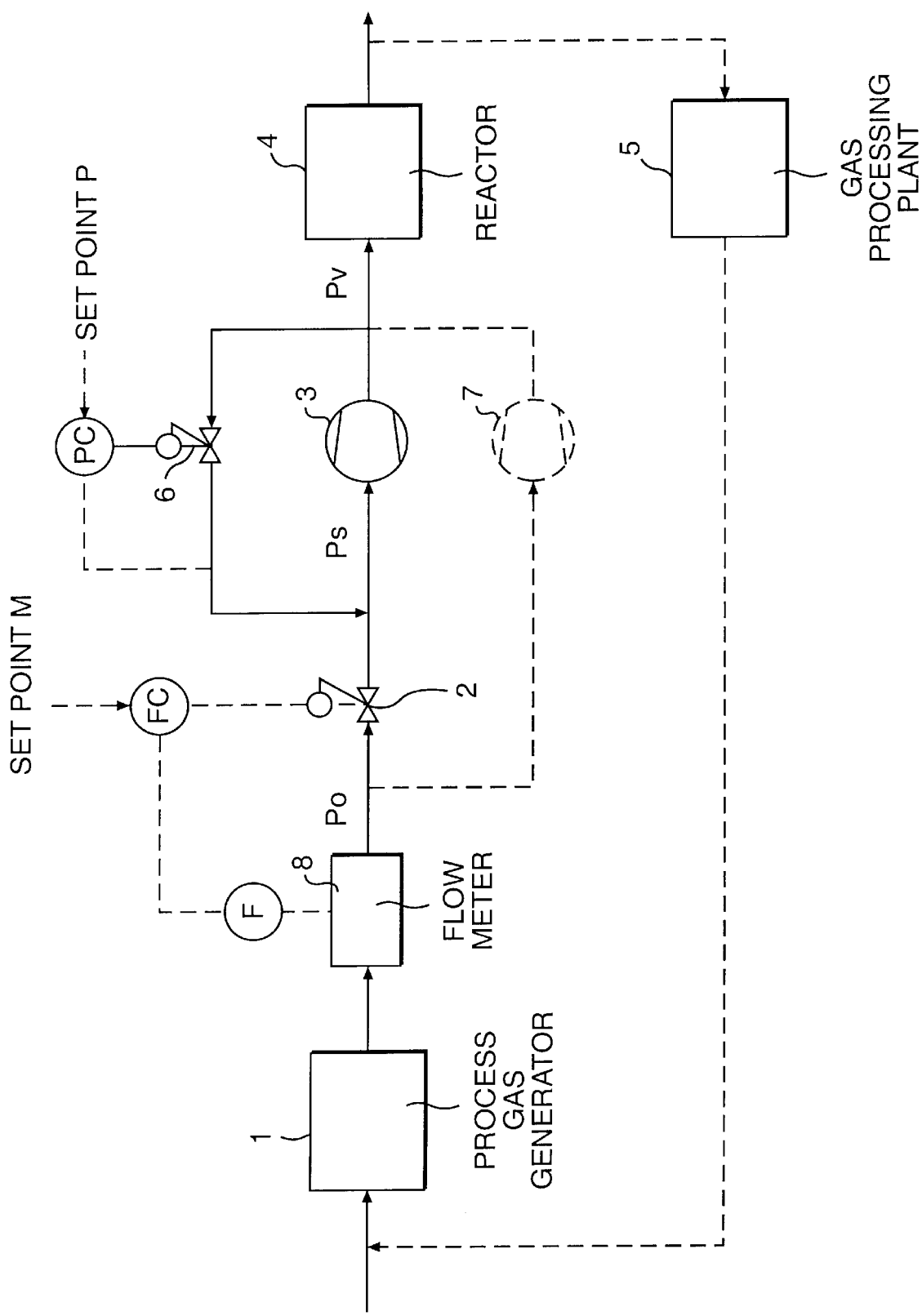

OZONE ENRICHED PROCESS GAS

BACKGROUND OF THE INVENTION

1. Field of the Invention

The invention relates to a method of producing an ozoniferous process gas in which oxygen or an oxygen-containing charge gas is enriched with ozone in one or more ozone producers, the process gas leaving the ozone producer or ozone producers and enriched with ozone. The enriched gas is fed to a compressor or a compressor group consisting of a plurality of compressors connected in parallel. Pressure is increased relative to the pressure on the suction side of the compressor, and is then fed to a reactor or another consumer, the process-gas delivery flow being adjustable and/or controllable.

U.S. Pat. No. 5,366,703 for example, discloses a method of this generic category.

2. Discussion of Background

In industrial applications, in the compression of gases to predeterminable final pressures, the delivery flow must also always be controlled, in which case, especially in processing applications where chemicals have to interact with one another, the mass flow and not the volumetric flow will be the variable to be controlled. Depending on compressor type and in particular depending on volumetrically acting compressor type (delivered volumetric flow is approximately constant and independent of the density). In the case of reciprocating pressure-piston, gear, screw compressors, rotating compressors and liquid ring pumps, this control may be effected according to the prior art via a speed control, a throttle control on the pressure side, intermittent operation of the compressor in combination with an accumulator or via a compressor bypass control.

If the gas flow to be compressed in such a processing application is an ozoniferous gas, such as for the bleaching of pulp by means of ozone for example, or in circuits having as high an ozone absorption in water as possible, apart from the requirement for controllability of the mass delivery flow there is also the requirement to prevent as far as possible the destruction of the ozone in the compressor, e.g. as a result of temperature rise during compression.

For the compression of ozoniferous gas, these requirements can best be fulfilled with water ring pumps, although the suitability of water-cooled single screw compressors is also mentioned in the technical literature. The compression of such ozoniferous gases by means of injectors is also possible, but is restricted to applications having a smaller pressure increase. In the case of the water ring pump mainly used (cf., e.g., LUEGGER volume 6 "Lexikon der Energietechnik und Kraftmaachinen", Deutsche Verlagsanstalt Stuttgart 1967, page 387, keyword "Flüssigkeitsring-Verdichter"), delivery-flow control via adaptation of the vane rotor speed can be used only to a very limited extent on account of the requisite stability of the water ring formed, and an intermittent operation or variable throttling on the pressure side are ruled out for reasons of economy and because of the higher pressure-increase rates desired. Up to now such water ring pumps for the applications mentioned have been controlled for mass delivery flow by means of a combination of suction-flow control member and compressor bypass control (circulation control). In this case, the compressor is always operated with the same power input and the same gas flow, and the differential flow between compressor gas flow and the desired gas delivery flow is expanded to suction pressure via a bypass control valve and fed to the compressor again. Here, the control variable for the bypass is the adjustable (but otherwise kept constant) suction pressure of the compressor. At positive compression pressures of 10 to 14 bar for example, the delivery flow could thus be controlled within an appropriate range of about 50 to 100%, the compressor suction pressure being set just below the ozone gas pressure. The ozone-producer pressure is always higher than the atmospheric pressure and is kept constant; the positive pressure is typically between 0.4 bar and 2.0 bar, which means that the pressure upstream of the compressor is also always higher than the atmospheric pressure. This is a special mode of operation of such water ring compressors which up to now has only been used in combination with ozone production (cf. U.S. Pat. No. 5,366,703).

In applications of water ring pumps with this control concept, however, ozone decomposition has nonetheless been observed, the extent of which has turned out to be approximately proportional to the set bypass flow and which has therefore led to undesirable additional consumption of energy and charge gas, especially at lower delivery-flow part loads.

SUMMARY OF THE INVENTION

Accordingly, one object of the invention is to specify a novel method of producing and compressing an ozoniferous process gas which has an increased delivery-flow control range but not the risk of ozone destruction.

This object is achieved according to the invention when a gas-flow control member is arranged upstream of the compressor or the group on the suction side and the variable mass flow is influenced essentially via a variable suction-gas density upstream of the compressor or the compressor group.

The invention here is not based on the idea of setting the variable mass flow in proportion to the volumetric flow, as was the case up to now, but of setting it via a variable suction-gas density. That is, of no longer keeping the compressor suction pressure and the compressor delivery flow approximately constant but of designing the compressor(s) and the associated bypass system(s) in such a way that, depending on the desired final compression pressure, which, however, is to be kept approximately constant over the entire control range for an application, the suction pressure of the compressor can be freely self-adjusting in a manner compatible with the delivery flow without intervention of the bypass control system. A delivery-flow output range of 60 to 100% is considered for example, which can be influenced by the delivery-flow control member on the suction side.

In this connection, the invention is in a certain sense based on the known control of centrifugal blowers, e.g. in the case of blast-furnace blowers, where the same air quantity is always to be fed irrespective of the resistance of the blast furnace, as known, for example, from the book by Friedrich Kluge "Kreiselgebläse und Kreiselverdichter radialer Bauart", Springer-Verlag Berlin/Göttinger/Heidelberg, 1953, pages 208 and 209, in particular FIG. 249 on page 209. There, the control to the same intake weight is effected by an orifice in the suction line of the compressor. In contrast to this, the idea in the case of the present invention is to permit a final compression pressure which is always the same to be provided for the reactor arranged downstream, despite variation in the mass delivery flow as a result of the variable ozone requirement of the downstream process. Here, the compressor intake pressure is not controlled directly but it can be freely adapted within comparatively wide limits, which is equivalent to a variation in the compressor ratio over the mass-flow control range.

For a further reduction in the delivery flow to 30 to 60% of the rated delivery flow for example, the bypass control may then additionally be brought into action in the system according to the invention after an adjustable, lowest appropriate suction pressure is reached.

The far greater mass-delivery-flow control range permitted and the elimination of ozone decomposition to the greatest possible extent by restriction of the compressor bypass encouraging ozone decomposition are advantageous in this system according to the invention. The enlarged delivery-flow control range will generally also result in a reduction in the number of compressors to be connected in parallel and will therefore help to reduce the capital costs.

The use of the suction-flow control according to the invention, designed for freely self-adjusting suction pressure, as well as a bypass system also permit in this application a continuous operation of the compressors in the entire appropriate gas-delivery range and lead to simplification in apparatus or to a reduction in the number of requisite compressors connected in parallel.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein the single figure shows an exemplary embodiment in the configuration of a plant for producing ozone, having a downstream compressor, downstream of which a reactor is arranged in which ozoniferous gas is treated with a substance.

DESCRIPTION OF THE PREFERRED EMBODIMENTS

Referring now to the drawing, the plant shown contains an ozone producer 1. Arranged downstream of the latter via a mass-flow control member 2 is a first compressor, a water ring pump 3. The compressed ozoniferous gas then passes into a reactor 4 in which the ozoniferous gas acts on another substance, e.g. cellulose pulp. The "consumed" gas can be returned into the ozone producer 1 via a gas processing plant 5. Plants of this type are part of the prior art and are described, for example, in all essential details in U.S. Pat. No. 5,336,703 mentioned at the beginning. In this patent specification, apart from processing details, the construction and function of the water ring pump 3 used here are described in detail.

In order to now set or also control the mass flow through the reactor 4, a flow controller FC is allocated to the mass-flow control member 2. In the flow controller FC, the actual flow value F—detected in a flowmeter 8 between ozone producer 1 and mass-flow control member 2—is compared with the mass flow (SET POINT M) to be predetermined by the consumer at any instant. By the combination of opening cross section and pressure difference—upstream pressure is the constant pressure $P_o$ reduced by $\Delta p$ in the flowmeter 8 at the outlet of the ozone producer 1 and downstream pressure is the freely self-adjusting variable suction pressure—is controlled in such a way that in each case a uniform final compressor pressure $P_v$ appears. To this end, the mass-flow control member 2 is designed in such a way that, e.g. at rated mass flow, this suction pressure $P_s$ is still just below a pressure which is obtained from the difference between ozone-producer pressure $P_o$ and the minimum pressure drop $P_o$–$P_s$ required for control stability at the flowmeter 8 and mass-flow control member 2, but at the lowest part-load point the suction pressure $P_s$ does not drop to values which are too low, since otherwise there is the risk of ozone destruction in the event of an excessive pressure drop at the mass-flow control member 2. There are also lower technical limits for the suction pressure, such as, for example, evaporation phenomena in the water ring pump 3.

As specified final compression pressure, the suction pressure $P_s$ of the compressor 3 or the compressor group, within a delivery-flow control range from rated output down to minimum part load, but at least down to 80% rated output, is freely adjustable within the suction-pressure limits possible for the compressor 3.

To widen the delivery-flow control range toward even lower delivery flows, provision is now made according to a further development of the method according to the invention for compressed process gas to be passed to the suction side of the compressor 3 by means of a bypass and a further mass-flow control member 6 between pressure and suction side of the compressor 3. The influencing of the further mass-flow control member 6 is here effected in a pressure controller PC by comparison of the actual value of the pressure $P_s$ with a set point P which can be fed in.

In order to also be able to freely select the base load within certain limits, a further embodiment of the invention provides for at least one further compressor 7 to be connected in parallel with the series circuit of compressor 3 and first mass-flow control member 2. This compressor 7 is preferably likewise a water ring pump and produces a delivery-flow base load.

However, the method according to the invention can also be used for other processes in which other gases in a controllable mass flow are to be compressed to certain uniform final pressures for the respective application. Thus, for example, for air-fed ozone producers, the compression of the air to 3.5 to 4.5 bar is very economical. As a rule, low-oil or oil-free reciprocating compressors have been used hitherto for these applications, which reciprocating compressors charge a gas receiver in intermittent operation. The higher charging pressure required for this, the gas receiver itself and the requisite intermittent operation lead to an increase in the operating and capital costs.

Obviously, numerous modifications and variations of the present invention are possible in light of the above teachings. It is therefore to be understood that within the scope of the appended claims, the invention may be practiced otherwise than as specifically described herein.

We claim:

1. A flow control method of an ozone enriched process gas comprising the steps of:
   producing an ozone enriched process gas;
   detecting a mass flow of the process gas; comparing the mass flow of the process gas with a mass flow set point;
   variably controlling the mass flow of the process gas as a result of the comparison;
   submitting the variably controlled process gas flow to first compression resulting in a uniform final pressure; and
   feeding the controlled compressed gas flow to a reactor for treating a substance with the process gas.

2. The method according to claim 1 further comprising the steps of:
   diverting a portion of the compressed process gas;
   controlling mass flow of the diverted portion; and
   adding the controlled diverted portion to the ozone enriched gas prior to compression thereby enabling lower flow rates from the compression step.

3. The method according to claim 1 further comprising the steps of:
   diverting a portion of the variably controlled process gas flow;
   submitting the diverted portion to a second compression step; and
   delivering the diverted compression portion to the first compressed gas flow for establishing a delivery flow base load.

4. A flow control method of an ozone enriched process gas comprising the steps of:
   producing an ozone enriched process gas;
   detecting a mass flow of the process gas; comparing the mass flow of the process gas with a mass flow set point;
   variably controlling the mass flow of the process gas as a result of the comparison;
   submitting the variably controlled process gas flow to first compression resulting in a uniform final pressure;
   diverting a portion of the compressed process gas;
   controlling the mass flow of diverted portion;
   adding the controlled diverted portion to the ozone enriched gas prior to compression thereby enabling lower flow rates from the compression step;
   diverting a portion of the variably controlled process as flow;
   submitting the diverted portion to a second compression step;
   delivering the diverted compression portion to the first controlled compressed gas flow for establishing a delivery flow base load; and
   feeding the controlled compressed gas flow including the diverted compressed portion, to a reactor for treating a substance with the process gas.

* * * * *